US008417802B2

(12) United States Patent
Williams et al.

(10) Patent No.: US 8,417,802 B2
(45) Date of Patent: *Apr. 9, 2013

(54) SYSTEM AND METHOD FOR CONFIGURING A CLIENT ELECTRONIC DEVICE (75) Inventors: Robert J. Williams, San Francisco, CA (US); Jay Jeffrey McLeman, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,536

(22) Filed: Jan. 10, 2012

(65) Prior Publication Data

US 2012/0110149 A1 May 3, 2012

Related U.S. Application Data (63) Continuation of application No. 11/767,825, filed on Jun. 25, 2007, now Pat. No. 8,095, 626.

(60) Provisional application No. 60/842,056, filed on Aug. 31, 2006, provisional application No. 60/843,212, filed on Sep. 8, 2006, provisional application No. 60/941,526, filed on Jun. 1, 2007.

(51) Int. Cl.
*G06F 15/177* (2006.01)
(52) U.S. Cl.
USPC .......................................... 709/220; 707/766
(58) Field of Classification Search .................. 709/200, 709/201, 220; 707/766
See application file for complete search history.

(56) References Cited

U.S. PATENT DOCUMENTS

| 6,981,212 | B1 | 12/2005 | Claussen et al. |
| 2003/0167334 | A1* | 9/2003 | Butler ........................... 709/227 |
| 2004/0019658 | A1* | 1/2004 | Plastina et al. ................ 709/217 |
| 2004/0088734 | A1* | 5/2004 | Donlan et al. ................. 725/109 |
| 2005/0027871 | A1* | 2/2005 | Bradley et al. ................ 709/227 |
| 2006/0026335 | A1* | 2/2006 | Hodgson et al. .................. 711/1 |
| 2006/0080702 | A1* | 4/2006 | Diez et al. ........................ 725/30 |
| 2006/0136964 | A1 | 6/2006 | Diez et al. |

(Continued)

FOREIGN PATENT DOCUMENTS

| JP | 2001159995 A | 6/2001 |
| JP | 2007036443 A | 2/2007 |

OTHER PUBLICATIONS

Office Action mailed Mar. 17, 2010 for U.S. Appl. No. 11/767,825, filed Jun. 25, 2007.
Office Action mailed Oct. 6, 2010 for U.S. Appl. No. 11/767,825, filed Jun. 25, 2007.

(Continued)

*Primary Examiner* — Patrice Winder
*Assistant Examiner* — Tauqir Hussain
(74) *Attorney, Agent, or Firm* — Aaron D. Barker; Stoel Rives LLP (57) ABSTRACT

A method and computer program product for obtaining a main configuration file from a client electronic device upon the client electronic device being coupled to at least a portion of a media distribution system. The main configuration file defines one or more enhanced functionalities of the client electronic device. The client electronic device is coupled to the at least a portion of the media distribution system using a binary transfer protocol configured to transfer media data from the at least a portion of a media distribution system to a client electronic device.

20 Claims, 4 Drawing Sheets

U.S. PATENT DOCUMENTS

| | | |
|---|---|---|
| 2006/0265503 A1 | 11/2006 | Jones et al. |
| 2006/0277555 A1* | 12/2006 | Howard et al. ............... 720/600 |
| 2006/0293065 A1* | 12/2006 | Chew et al. ................ 455/456.3 |
| 2007/0078713 A1 | 4/2007 | Ottt, IV et al. |
| 2007/0191108 A1 | 8/2007 | Brunet De Courssou et al. |
| 2007/0214147 A1 | 9/2007 | Bodin et al. |
| 2007/0276866 A1 | 11/2007 | Bodin et al. |
| 2009/0030806 A1* | 1/2009 | Harper et al. ................... 705/26 |
| 2009/0158344 A1* | 6/2009 | Anglin, Jr. ...................... 725/46 |
| 2009/0199218 A1* | 8/2009 | Goring et al. ................ 719/328 |
| 2009/0254836 A1* | 10/2009 | Bajrach ........................ 715/745 |
| 2010/0017184 A1 | 1/2010 | Vijayan Retnamma et al. |

OTHER PUBLICATIONS

Office Action mailed Jun. 22, 2011 for U.S. Appl. No. 11/767,825, filed Jun. 25, 2007.

Notice of Allowance mailed Nov. 10, 2011 for U.S. Appl. No. 11/767,825, filed Jun. 25, 2007.

International Search Report and Written Opinion mailed Sep. 8, 2008 for PCT Application No. PCT/US08/65283, filed May 30, 2008.

\* cited by examiner

SYSTEM AND METHOD FOR CONFIGURING A CLIENT ELECTRONIC DEVICE

RELATED APPLICATION(S)

This application is a continuation of U.S. application Ser. No. 11/767,825, filed Jun. 25, 2007, which claims the benefit of priority of the following applications: U.S. Provisional Patent Application Ser. No. 60/842,056, entitled "API-ACCESSIBLE MEDIA DISTRIBUTION SYSTEM" and filed Aug. 31, 2006; U.S. Provisional Patent Application Ser. No. 60/843,212, entitled "API-ACCESSIBLE MEDIA DISTRIBUTION SYSTEM" and filed Sep. 8, 2006; and U.S. Provisional Patent Application Ser. No. 60/941,526, entitled "PERSONAL MEDIA DEVICE CONFIGURATION SYSTEM AND METHOD" and filed Jun. 1, 2007, all of which are hereby incorporated by reference in their entireties.

TECHNICAL FIELD

This disclosure relates to client electronic devices and, more particularly, to the configuring of client electronic devices.

BACKGROUND

Media distribution systems (e.g., the Rhapsody™ service offered by RealNetworks, Inc. of Seattle, Wash.) distribute media data to a user's client electronic device (e.g., a personal media device, a personal digital assistant, or a multimedia cellular telephone) from a media server. A media distribution system may distribute media data by allowing a user to e.g., receive downloaded media data files and/or stream remote media data files.

Typically, different media distribution systems offer different levels of functionality and different features. For example, one media distribution system may offer "radio channels" while another media distribution system may not. Often, in order to take advantage of such enhanced functionality, a custom (i.e., nonstandard) communications protocol may be required for the client electronic device to communicate with the media distribution system. Unfortunately, by requiring the client electronic device to communicate using a custom communication protocol, manufacturers may be reluctant to adapt their devices to work with such a custom communications protocol.

SUMMARY OF DISCLOSURE

In a first implementation, a method includes obtaining a main configuration file from a client electronic device upon the client electronic device being coupled to at least a portion of a media distribution system. The main configuration file defines one or more enhanced functionalities of the client electronic device. The client electronic device is coupled to the at least a portion of the media distribution system using a binary transfer protocol configured to transfer media data from the at least a portion of a media distribution system to a client electronic device.

One or more of the following features may be included. One or more supplemental configuration files may be provided to the client electronic device. The one or more supplemental configuration files may be chosen from the group consisting of: a subscription file; a messaging file; a channels file; an add to library file; a ratings file; a ratings mapping file; and a radio PC file. At least one of the main configuration file and the one or more supplemental configuration files may be an XML configuration file.

The client electronic device may be a MTP-enabled client electronic device. The MTP-enabled client electronic device may be a PLAYSFORSURE® client electronic device.

The at least a portion of the media distribution system may include a client-side media manager. The client-side media manager may be configured to interface with a server-side media distribution system. The at least a portion of the media distribution system may include a server-side media distribution system.

The client electronic device may be configured to be wirelessly-coupled to the at least a portion of the media distribution system. The client electronic device may be configured to be hardwire-coupled to the at least a portion of the media distribution system.

A SyncID, transferable using the binary transfer protocol, may be processed to extract one or more of a versionid, a trackid, an artistid, an albumid, an albumartistid, and a genreid. One or more of the versionid, the trackid, the artistid, the albumid, the albumartistid and the genreid may be stored within a device database included within the client electronic device.

In another implementation, a computer program product resides on a non-transitory computer readable medium that has a plurality of instructions stored on it. When executed by a processor, the instructions cause the processor to perform operations including obtaining a main configuration file from a client electronic device upon the client electronic device being coupled to at least a portion of a media distribution system. The main configuration file defines one or more enhanced functionalities of the client electronic device. The client electronic device is coupled to the at least a portion of the media distribution system using a binary transfer protocol configured to transfer media data from the at least a portion of a media distribution system to a client electronic device.

One or more of the following features may be included. One or more supplemental configuration files may be provided to the client electronic device. The one or more supplemental configuration files may be chosen from the group consisting of: a subscription file; a messaging file; a channels file; an add to library file; a ratings file; a ratings mapping file; and a radio PC file. At least one of the main configuration file and the one or more supplemental configuration files may be an XML configuration file.

The client electronic device may be a MTP-enabled client electronic device. The MTP-enabled client electronic device may be a PLAYSFORSURE® client electronic device.

The at least a portion of the media distribution system may include a client-side media manager. The client-side media manager may be configured to interface with a server-side media distribution system. The at least a portion of the media distribution system may include a server-side media distribution system.

The client electronic device may be configured to be wirelessly-coupled to the at least a portion of the media distribution system. The client electronic device may be configured to be hardwire-coupled to the at least a portion of the media distribution system.

A SyncID, transferable using the binary transfer protocol, may be processed to extract one or more of a versionid, a trackid, an artistid, an albumid, an albumartistid, and a genreid. One or more of the versionid, the trackid, the artistid, the albumid, the albumartistid and the genreid may be stored within a device database included within the client electronic device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE DISCLOSURE

System Overview

Figure 1:
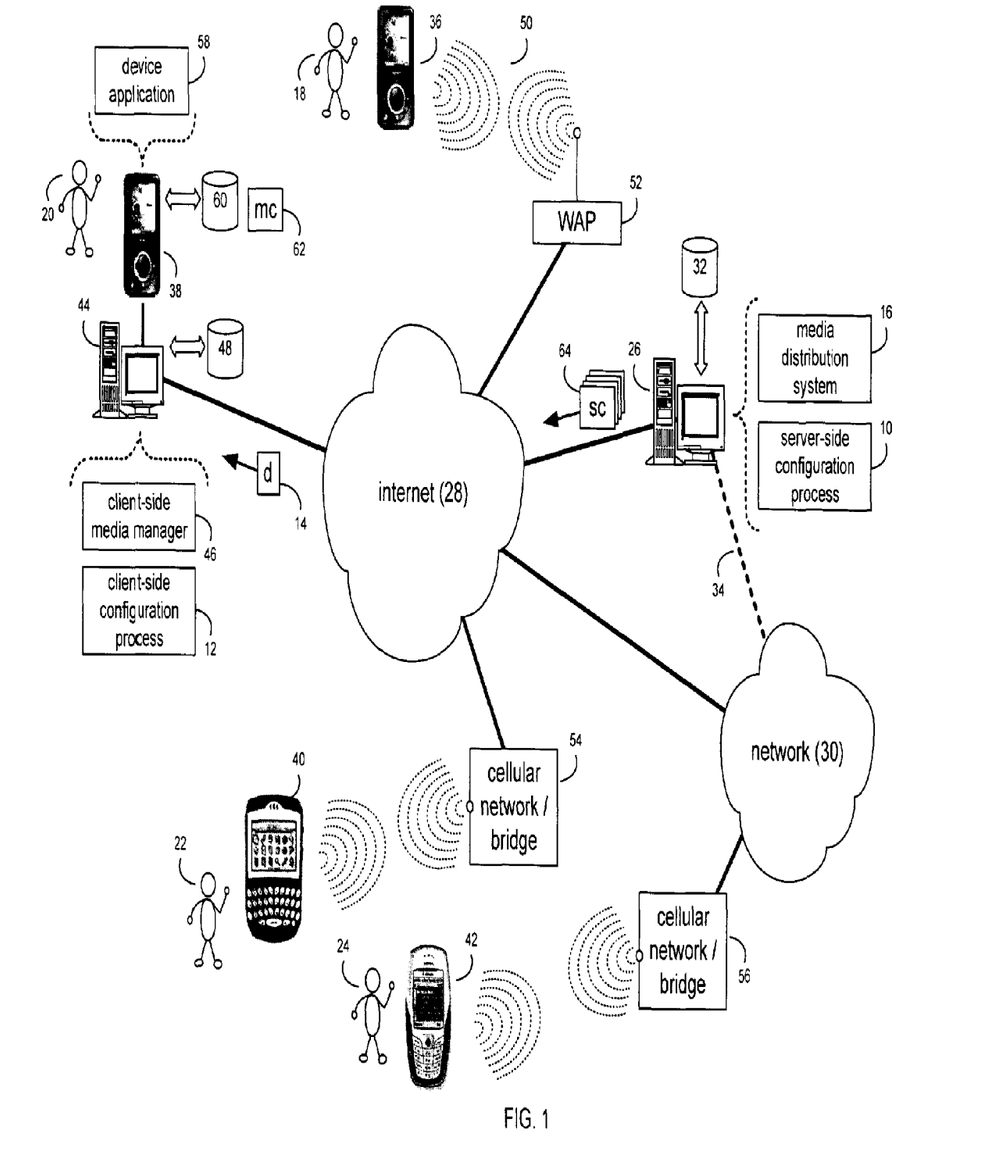
FIG. 1 is a diagrammatic view of a media distribution system, a client-side media manager, and a client electronic device coupled to a distributed computing network.

Referring to FIG. 1, there is shown a server-side configuration process 10 and a client-side configuration process 12. As will be discussed below in greater detail, each of server-side configuration process 10 and client-side configuration process 12 may configure a client electronic device to interface with and obtain media data 14 from media distribution system 16.

Examples of media data 14 may include, but are not limited to, digitally-encoded audio and/or video media data that may be compressed using known compression techniques. Examples of such compression techniques may include but are not limited to MPEG-1, MPEG-2, MPEG-4, H.263, H.264, Advanced Audio Coding, and other techniques promulgated by e.g., the International Standards Organization and the Motion Picture Experts Group.

Media data 14 may include but is not limited to: purchased downloads received from media distribution system 16 (i.e., media data licensed to a user for use in perpetuity); subscription downloads received from media distribution system 16 (i.e., media data licensed to a user for use while a valid subscription exists with media distribution system 16); and media data streamed from media distribution system 16, for example.

Media distribution system 16 may provide media data (i.e., in the form of streams and/or files) to a plurality of users (e.g., users 18, 20, 22, 24). Examples of media distribution system 16 may include but are not limited to the Rhapsody™ service offered by RealNetworks, Inc. of Seattle, Wash.

Media distribution system 16 may be a server application that resides on and is executed by server computer 26 (e.g., a server computer) that is connected to network 28 (e.g., the Internet). Server computer 26 may be a web server running a network operating system, examples of which may include but are not limited to Microsoft Windows XP Server™, Novell Netware™, or Redhat Linux™. Examples of server computer 26 may include but are not limited to: a personal computer, a server computer, and a plurality of server computers.

Server computer 26 may also execute a web server application, examples of which may include but are not limited to Microsoft IIS™, Novell Webserver™, or Apache Webserver™, that allows for HTTP (i.e., HyperText Transfer Protocol) access to server computer 26 via network 28. Network 28 may be connected to one or more secondary networks (e.g., network 30), such as: a local area network; a wide area network; or an intranet, for example.

The instruction sets and subroutines of media distribution system 16 and server-side configuration process 10, which may be stored on storage device 32 coupled to server computer 26, may be executed by one or more processors (not shown) and one or more memory architectures (not shown) incorporated into server computer 26. Additionally, media data 14 available from media distribution system 16 may be stored on e.g., storage device 32 coupled to server computer 26. Storage device 32 may include but is not limited to a hard disk drive, a tape drive, an optical drive, a RAID array, a random access memory (RAM), or a read-only memory (ROM).

Users 18, 20, 22, 24 may access media distribution system 16 through e.g., network 28 and/or secondary network 30. Further, server computer 26 (i.e., the computer that executes media distribution system 16) may be connected to network 28 through secondary network 32, as illustrated with phantom link line 34.

Media distribution system 16 may be accessed through various client electronic devices, examples of which may include, but are not limited to: personal media device 36; personal media device 38, personal digital assistant 40; data-enabled cellular telephone 42; televisions (not shown); cable boxes (not shown); internet radios (not shown); or dedicated network devices (e.g., A Roku™ Soundbridge M500, M1000 and M2000; not shown), for example.

Media distribution system 16 may be accessed directly or may be accessed indirectly (e.g., through a client computer) by the client electronic devices (e.g., personal media device 36; personal media device 38, personal digital assistant 40; data-enabled cellular telephone 42). For example, users 18, 22, 24 are shown directly accessing media distribution system 16 through personal media device 36, personal digital assistant 40, and data-enabled cellular telephone 42. Conversely, user 20 is shown indirectly accessing media distribution system 16 through personal media device 38 via client computer 44.

The client electronic devices may be wirelessly-coupled or hardwired to network 30, 32 (and, therefore, media distribution system 16).

For example, personal media device 38 is shown hardwired to client computer 44, which is shown directly coupled to network 28 via a hardwired network connection. Client computer 44 may execute a client-side media manager 46 (examples of which may include but are not limited to Microsoft Internet Explorer™ available from Microsoft Inc, of Redmond, Wash., Rhapsody™ client & RealPlayer™ client available from RealNetworks, Inc. of Seattle, Wash., and a specialized interface) that allows e.g., user 20 to access and configure media distribution system 16 via network 28 (or network 30). Client computer 44 may execute an operating system, examples of which may include but are not limited to Microsoft Windows XP™ and Redhat Linux™.

The instruction sets and subroutines of client-side media manager 46, which may be stored on a storage device 48 coupled to client computer 44, may be executed by one or more processors (not shown) and one or more memory architectures (not shown) incorporated into client computer 44. Storage device 48 may include but is not limited to a hard disk drive, a tape drive, an optical drive, a RAID array, a random access memory (RAM), or a read-only memory (ROM).

As discussed above, the client electronic devices may be wirelessly-coupled to network 30, 32 (and, therefore, media distribution system 16). For example, personal media device 36 is shown wirelessly coupled to network 28 via a wireless communication channel 50 established between personal media device 36 and wireless access point (i.e., WAP) 52, which is shown directly coupled to network 28. WAP 52 may be, for example, an IEEE 802.11a, 802.11b, 802.11g, Wi-Fi, and/or Bluetooth device that is capable of establishing communication channel 50 between personal media device 36 and WAP 52.

As is known in the art, the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Additionally, personal digital assistant 40 is shown wirelessly coupled to network 28 via cellular/network bridge 54 (which is shown directly coupled to network 28); and data-enabled cellular telephone 42 is shown wirelessly coupled to network 30 via cellular/network bridge 56 (which is shown directly coupled to network 30).

Client Electronic Devices:

As discussed above, examples of client electronic devices may include personal media devices 36, 38, personal digital assistant 40, and data-enabled cellular telephone 42. Accordingly, while the following disclosure is directed towards personal media device 38, it is understood that the following disclosure may be equally applied to any client electronic device (including personal media device 36), personal digital assistant 40, cellular telephone 42, televisions (not shown); cable boxes (not shown); internet radios (not shown); and dedicated network devices (not shown).

Figure 2:
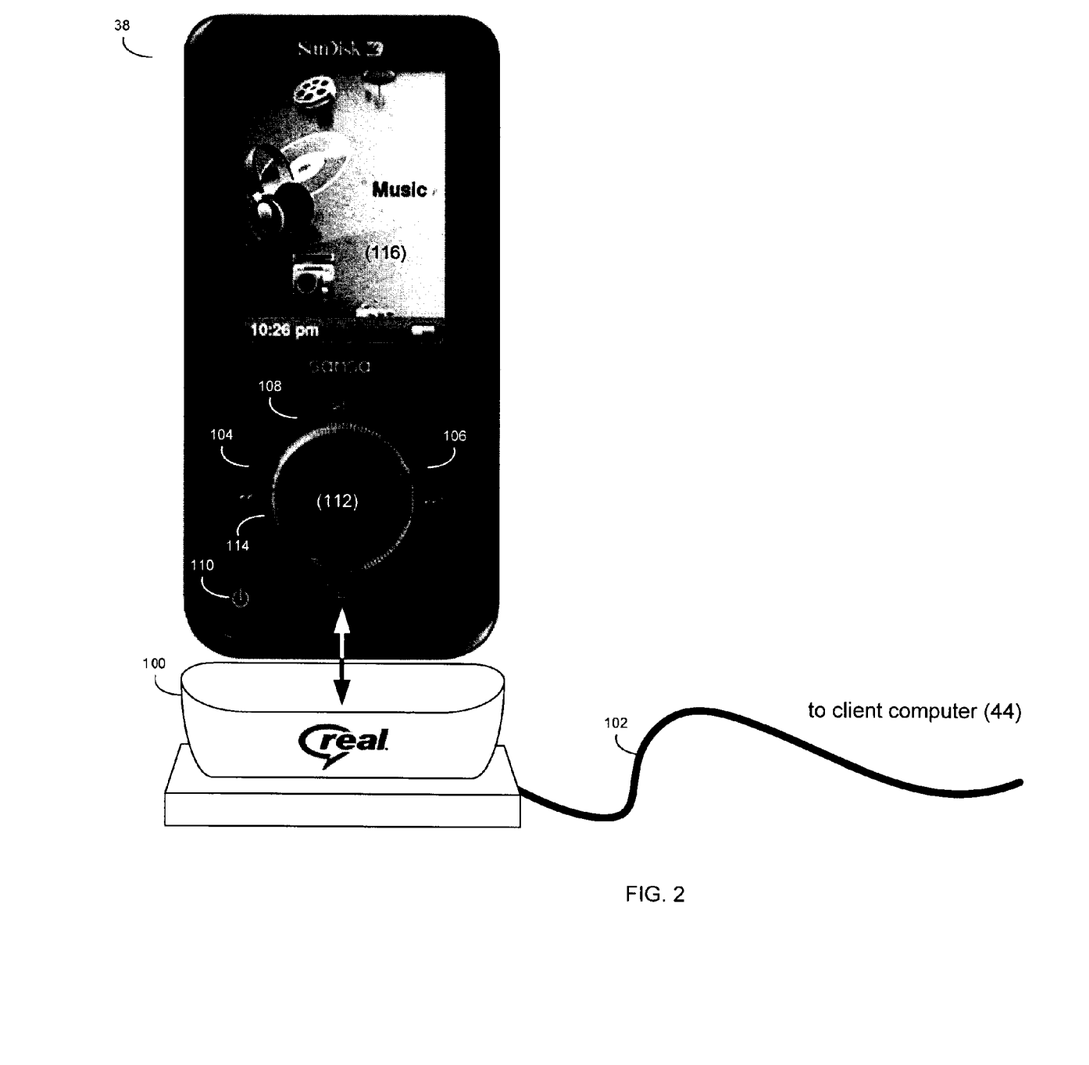
FIG. 2 is an isometric view of the client electronic device of FIG. 1.

Referring also to FIG. 2, personal media device 38 may be connected to e.g., client computer 44 via a docking cradle 100. Typically, personal media device 38 includes a bus interface (to be discussed below in greater detail) that couples personal media device 38 to docking cradle 100. Docking cradle 100 may be coupled (with cable 102) to e.g., a Universal Serial Bus (i.e., USB) port, a serial port, or an IEEE 1394 (i.e., FireWire) port included within client computer 44. For example, the bus interface included within personal media device 38 may be a USB interface, and docking cradle 100 may function as a USB hub (i.e., a plug-and-play interface that allows for "hot" coupling and uncoupling of personal media device 38 and docking cradle 100).

Client computer 44 may function as an Internet gateway for personal media device 38. For example, through the use of e.g., the universal plug and play protocol (i.e., UPnP), personal media device 38 may use client computer 44 to access media distribution system 16 via network 28 (and network 30) and obtain media data 14. Specifically, upon receiving a request for media distribution system 16 from personal media device 38, client computer 44 (acting as an internet client on behalf of personal media device 38), may request the appropriate web page/service from server computer 26 (i.e., the computer that executes media distribution system 16). When the requested web page/service is returned to client computer 44, client computer 44 may relate the returned web page/service to the original request (placed by personal media device 38) and may forward the web page/service to personal media device 38. Accordingly, client computer 44 may function as a conduit for coupling personal media device 38 to server computer 26 and, therefore, media distribution system 16.

Figure 3:
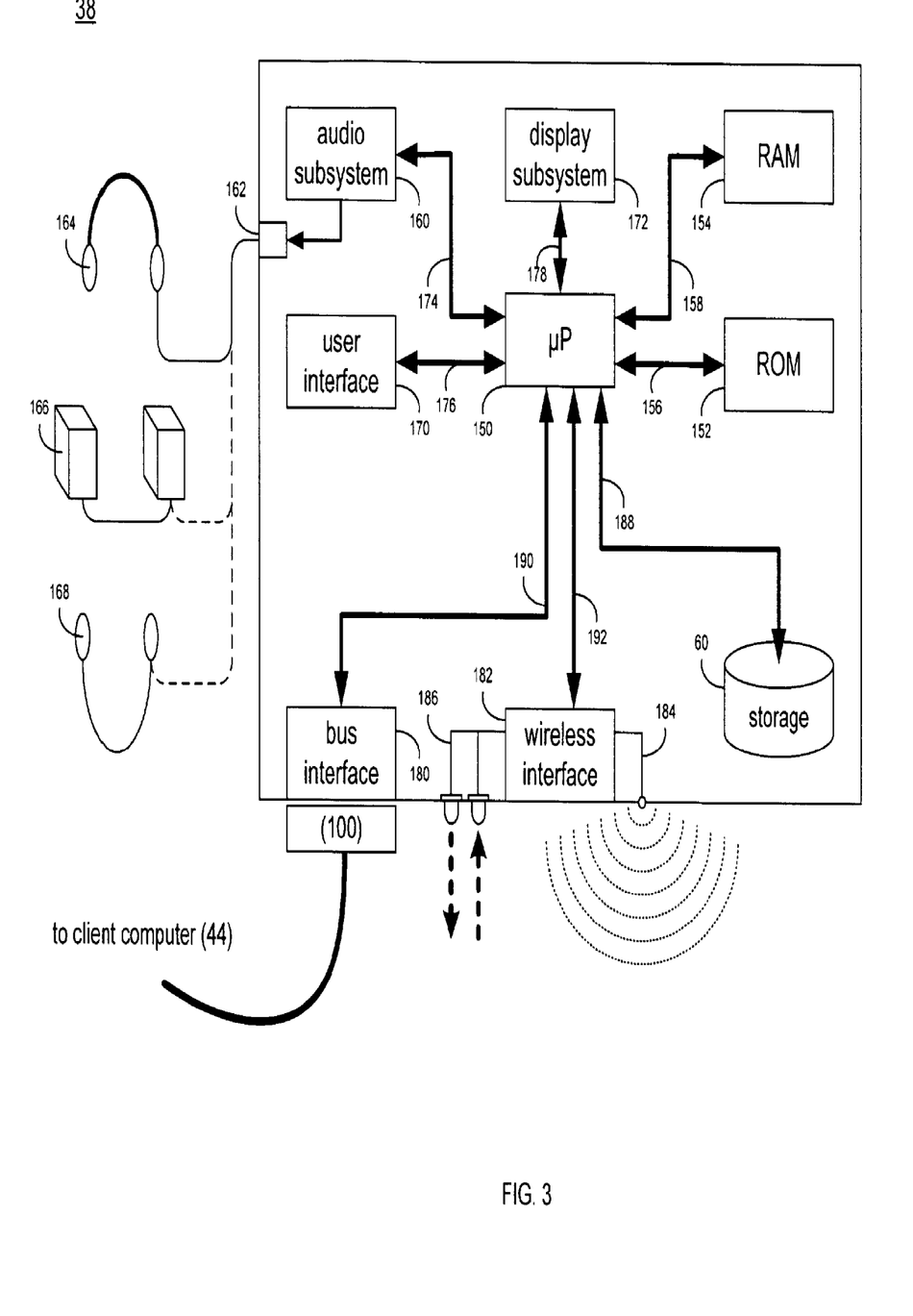
FIG. 3 is a diagrammatic view of the client electronic device of FIG. 1.

Referring also to FIG. 3, a diagrammatic view of personal media device 38 is shown. Personal media device 38 may include microprocessor 150 (e.g., an ARM™ microprocessor produced by Intel Corporation of Santa Clara, Calif.), non-volatile memory (e.g., read-only memory 152), and volatile memory (e.g., random access memory 154); each of which may be interconnected via one or more data/system buses 156, 158. Personal media device 38 may also include an audio subsystem 160 for providing e.g., an analog audio signal to an audio jack 162 for removably engaging e.g., a headphone assembly 164, a remote speaker assembly 166, or an ear bud assembly 168, for example. Alternatively, personal media device 38 may be configured to include one or more internal audio speakers (not shown).

Personal media device 38 may execute a device application 58 (examples of which may include but are not limited to Rhapsody™ client, RealPlayer™ client, or a specialized interface). Personal media device 38 may run an operating system, examples of which may include but are not limited to Microsoft Windows CE™, Redhat Linux™, Palm OS™, or a device-specific (i.e., custom) operating system.

The instruction sets and subroutines of device application 58, which may be stored on storage device 60 coupled to personal media device 38, may be executed by one or more processors (not shown) and one or more memory architectures (not shown) incorporated into personal media device 38. Storage device 60 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

Personal media device 38 may also include user interface 170 and display subsystem 172. User interface 170 may receive data signals from various input devices included within personal media device 38, examples of which may include (but are not limited to): backward skip switch 104; forward skip switch 106; play/pause switch 108; menu switch 110; selector switch 112; and wheel assembly 114, for example. Display subsystem 172 may provide display signals to display panel 116 included within personal media device 38. Display panel 116 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

As discussed above, personal media device 38 may include bus interface 180 for interfacing with e.g., client computer 44 via docking cradle 100. Additionally and as discussed above, personal media device 38 may be wirelessly coupled to network 28 (and/or other personal media devices) via e.g., a wireless communication channel 50 established between personal media device 38 and e.g., WAP 52. Accordingly, personal media device 38 may include a wireless interface 182 for wirelessly-coupling personal media device 38 to network 28 (or network 30) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device. Further and as discussed above, personal media device 38 may include a storage device 60 for storing the instruction sets and subroutines of device application 58. Additionally, storage device 60 may be used to store media data (e.g., files and/or streams) downloaded from media distribution system 16.

Storage device 60, bus interface 180, and wireless interface 182 may each be coupled with microprocessor 150 via one or more data/system buses 188, 190, 192 (respectively). As discussed above, media distribution system 16 may distribute media data to users 18, 20, 22, 24 such that the media data distributed may be in the form of media data streams and/or media data files.

Configuration Process:

As discussed above, each of server-side configuration process 10 and client-side configuration process 12 may configure a client electronic device (e.g., personal media device 38) to interface with and obtain media data 14 from media distribution system 16.

Typically, when the client electronic device is communicating with media distribution system 16 through another device, a client-side configuration process may be executed on the device through which the client electronic device is connecting. For example, as personal media device 38 communicates with media distribution system 16 though client computer 44, client-side configuration process 12 may be executed on client computer 44 and may configure personal media device 38 to interface with media distribution system 16.

Alternatively, when the client electronic device is directly communicating with media distribution system 16, a server-side configuration process may be executed on the device on which media distribution system 16 is executed. For example, as personal media device 36, personal digital assistant 40, and data-enabled cellular telephone 42 directly communicate with media distribution system 16, server-side configuration process 10 may be executed on server computer 26 and may configure personal media device 36, personal digital assistant 40, and data-enabled cellular telephone 42 to interface with media distribution system 16.

When the client electronic devices (e.g., personal media devices 36, 38, personal digital assistant 40 and data-enabled cellular telephone 42) communicate with media distribution system 16 (either directly or through client computer 44), a binary transfer protocol may be utilized to e.g., configure the client electronic device and transfer media data files to the client electronic device from e.g., media distribution system 16 or client-side media manager 46. Examples of the binary transfer protocol may include but are not limited to a Media Transfer Protocol (i.e., MTP). Accordingly, the client electronic devices (e.g., personal media devices 36, 38, personal digital assistant 40 and data-enabled cellular telephone 42) may be MTP-enabled client electronic devices.

MTP is a set of custom extensions of the Picture Transfer Protocol (PTP) devised by Microsoft™. While PTP was configured to allow for the transfer of digital images from digital cameras to personal computers, MTP allows for the transfer of media data from various client electronic devices (e.g., personal media devices 36, 38, personal digital assistant 40 and data-enabled cellular telephone 42) to personal computers.

Examples of such MTP-enabled client electronic devices may include but are not limited to a PLAYSFORSURE® client electronic device.

Microsoft™ PLAYSFORSURE® is a certification given by Microsoft™ to portable devices (e.g., personal media devices 36, 38, personal digital assistants 40, data-enabled cellular telephone 42) and content services (e.g., media distribution system 16) that have been tested for compatibility and performance requirements (e.g., CODEC support, DRM support, user interface responsiveness, device performance, compatibility with Windows Media Player™, and synchronization performance).

Configuration File

Figure 4:
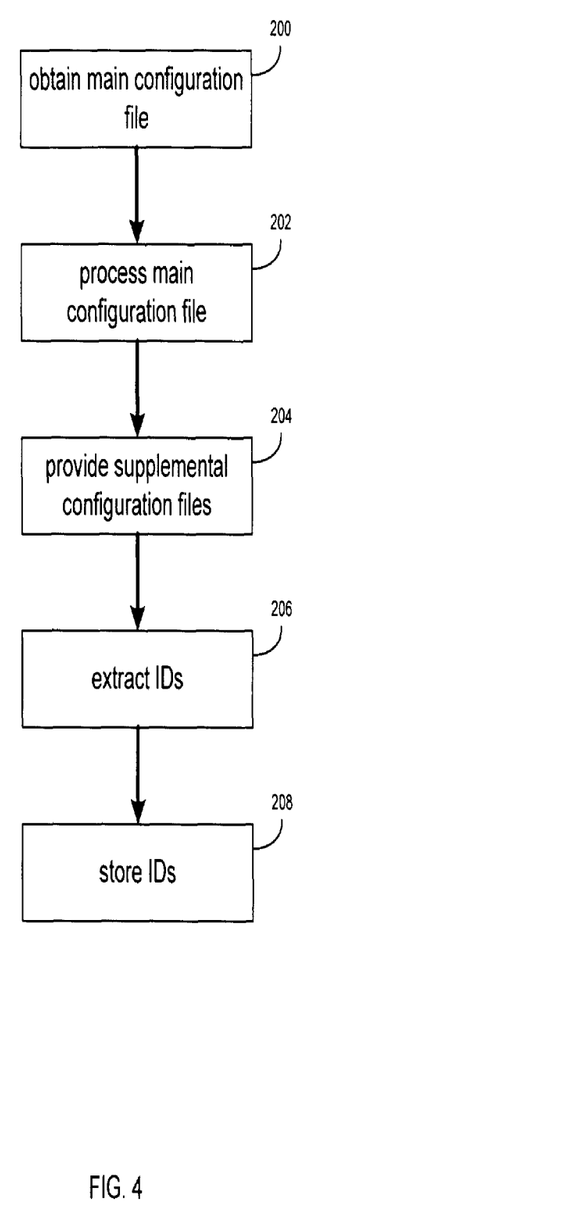
FIG. 4 is a flowchart of a process executed by the media distribution system of FIG. 1.

Upon the client electronic device directly or indirectly accessing media distribution system 16, server-side configuration process 10 or client-side configuration process 12 (respectively) may obtain 200 main configuration file 62 from the client electronic device. Main configuration file 62 may be stored within a known directory within e.g., storage device 60 of e.g., personal media device 38. As discussed above, examples of client electronic devices may include personal media devices 36, 38, personal digital assistant 40, and data-enabled cellular telephone 42. Accordingly, while the above disclosure and the following disclosure is directed towards personal media device 38, it is understood that the following disclosure may be equally applied to any client electronic device (including personal media device 36, personal digital assistant 40, cellular telephone 42, televisions (not shown); cable boxes (not shown); interne radios (not shown); and dedicated network devices (not shown).

Main configuration file 62 may be an XML configuration file that is installed at the time that the device is manufactured and may define one or more enhanced functionalities of personal media device 38. An example of main configuration file 62 is as follows:

```
<?xml version="1.0" encoding="UTF-8"?>
<xsl:stylesheet xmlns:xs1="www.w3.org/TR/WD-xs1">
  <xsl:template>
    <!--Capabilities Block (ReadOnly)-->
    <Capabilities>
      <!--Rhapsody DNA version (starts at 100)-->
      <RhapDNAVersion/>
        <!--Boolean, does this device support channels?-->
        <RhapChannelCapable l>
          <!--Preferred Album Art Size/-->
          <PreferredAlbumArtSize/>
          <!--Path to Video files-->
          <VideoPath/>
          <!--Path to Photo Files-->
          <PhotoPath/>
          <!--Path to Audio(Music) files-->
          <AudioPath/>
          <!--Path to Rhapsody Artist Information Files-->
          <ArtistInfoPath/>
          <!--Path to Rhapsody Text Files-->
          <TextPath/>
          <!--Path to Recorded audio files-->
          <RecordingsPath/>
          <!-Path to Channel files-->
          <ChannelsPath>
      <!--Determines whether devices can display a service specific splash screen on device start-->
          <SupportsServiceLogo/>
    </Capabilities>
  </xsl:template>
</xsl:stylesheet>
```

For illustrative purposes, main configuration file 62 is shown to define one or more of the following functionalities, examples of which may include but are not limited to:

A version indicator that indicates to media distribution system 16 and/or client-side media manager 46 what version of the extensions specification is being implemented on personal media device 38.

A Boolean value indicating whether personal media device 38 supports channels. As is known in the art, channels are similar to radio stations (or constantly refreshed playlists) on personal media device 38, which automatically update with new media content that replaces the media content that the user already listened to. This automatic updating process may occur each time that personal media device 38 is coupled with media distribution system 16 and/or client-side media manager 46.

An integer value may represent the preferred album art size for personal media device 38.

A series of path attributes may define the preferred location on personal media device 38 for various types of media.

A Boolean value may indicate whether personal media device 38 supports displaying a service logo splash screen at personal media device 38 start up.

Once configuration process 10, 12 obtains 200 main configuration file 62 from personal media device 38, configuration process 10, 12 may process 202 main configuration file 62 so that media distribution system 16 and/or client-side media manager 46 may determine which features/functionality are supported by personal media device 38.

Once main configuration file 62 is processed 202, configuration process 10, 12 may provide 204 one or more supplemental configuration files 64 to the client electronic device (e.g., personal media device 38), which may further define the functionality of the client electronic device. One or more of the supplemental configuration files 64 may be an XML configuration file.

Examples of supplemental configuration files 64 may include but are not limited to: a subscription file; a messaging file; a channels file; an add to library file; a ratings file; a ratings mapping file; and a radio PC file.

The Subscriptioninfo.xml File

The subscriptioninfo.xml file may be provided 202 to personal media device 38 and may define the basic details of the user's account status, including the user name, the type of account and the time remaining before the subscription licenses expires.

An example of the subscriptioninfo.xml file is as follows:

```
<?xml version="1.0" encoding="UTF-8"?>
<xsl:stylesheet xmlns:xs1="www.w3.org/TR/WD-xs1">
    <xsl:template>
        <!--SubscriptionInfo Block (Read/Write)-->
        <SubscriptionInfo>
            <!--Rhapsody User ID GUID-->
            <UserIDGUID/>
            <!--User ID Text-->
            <UserID/>
            <!--Boolean - TRUE- Trial Active, FALSE, regular subscription-->
            <TrialActive/>
            <!--ToGo, Unlimited, Channels-->
            <AccountType/>
            <!-Duration of DRM license, use TimeOfLicense and Duration
            to find expire-->
            <LicenseDuration/>
            <!--Time when last licensed as an absolute date-->
            <TimeOfLicense/>
            <!-Official name of service for use in UI ex. Rhapsody or Best Buy
            Digital Music Store-->
            <ServiceName/>
        </SubscriptionInfo>
    </xsl:template>
</xsl:stylesheet>
```

For illustrative purposes, the subscriptioninfo.xml file may define one or more of the following functionalities:

If the TimeOfLicense, UserIDGUID and UserID fields are missing or empty then the device is not yet registered to any user.

The TimeOfLicense and LicenseDuration fields return information that may indicate when the device was last registered and when that registration expires. The date/time values may be denoted in seconds from a standard time value.

The Messaging.xml File

The messaging.xml file may be provided 202 to personal media device 38 and may allow media distribution system 16 and/or client-side media manager 46 to provide startup and shutdown messaging alerts for personal media device 38. Media distribution system 16 and/or client-side media manager 46 may specify whether the messaging alert is enabled/disabled and the message duration, priority and text for both the startup and shutdown messages. Additionally, a service logo may be displayed upon personal media device 38 starting up.

An example of the messaging.xml file is as follows:

```
<?xml version="1.0" encoding="UTF-8"?>
<xsl:stylesheet xmlns:xs1="www.w3.org/TR/WD-xs1">
    <xsl:template>
        <!--Device Messaging(R)-->
        <Messaging>
            <!--Startup Messages-->
            <StartupMessage>
                <MessageEnable/>
                <MessageText/>
                <MessageDuration/>
                <MessageAttributes/>
            </StartupMessage>
            <!--Shutdown Messages to the user-->
            <ShutdownMessage>
                <MessageEnable/>
                <MessageText/>
                <MessageDuration/>
                <MessageAttributes/>
            </ShutdownMessage>
        <!--Service Specific Splash screen-->
            <ServiceLogo>
                <LogoEnable/>
                <LogoDuration/>
                <!--path or object id of image file to use as logo screen-->
                <LogoPath/>
            </ServiceLogo>
        </Messaging>
    </xsl:template>
</xsl:stylesheet>
```

The Channels.xml File

The channels.xml file may be provided 202 to personal media device 38 if main configuration file 62 indicates that personal media device 38 supports channels.

As discussed above, a channel may be considered an "endless" playlist that is programmed by media distribution system 16 and/or client-side media manager 46. The channels.xml file may provide a pointer to the last track rendered within the channel playlist so that playback may resume at the place where rendering stopped. If personal media device 38 supports channels, personal media device 38 may provide a user interface for selecting a channel.

Whenever e.g., user 20 couples personal media device 38 to media distribution system 16 and/or client-side media manager 46, the channels on personal media device 38 may be refreshed. For example, any tracks that have been rendered may be replaced with new tracks. However, unrendered tracks may be left on personal media device 38 for future rendering. When media tracks for use within a channel are written to personal media device 38, the tracks may be hidden and are typically not considered to be part of the music library of personal media device 12.

An example of the channels xml file is as follows:

```
<?xml version="1.0" encoding="UTF-8"?>
<xsl:stylesheet xmlns:xs1="www.w3.org/TR/WD-xs1">
    <xsl:template>
```

-continued

```
<!--Channels Block (Read/Write)-->
  <Channels>
    <!--Channel entry-->
    <Channel>
      <Restricted/>
      <ChannelID/>
      <ChannelType/>
      <PlaylistPath/>
      <PlaylistPUOID/>
      <ChannelTitle/>
      <ChannelDescription/>
      <LastUpdated/>
      <ChannelSize/>
    </Channel>
  </Channels>
</xsl:template>
</xsl:stylesheet>
```

The AddToLibrary.dat File

The addtolibrary.dat file may be provided 202 to personal media device 38 and may be read and cleared by media distribution system 16 and/or client-side media manager 46 when personal media device 38 is coupled to media distribution system 16 and/or client-side media manager 46. The addtolibrary.dat file may include a list of track identifiers that user 20 has added to their library while listening to the channels included within personal media device 38. The track identifiers may be included within the PLAYSFORSURE® metadata of the track to be added.

As discussed above and as is known in the art, channels are similar to radio stations on personal media device 38, which automatically update with new media content that replaces the media content that the user already listened to. This automatic updating process may occur each time that personal media device 38 is coupled with media distribution system 16 and/or client-side media manager 46. In the event that a user (e.g., user 20) likes a track that was included within a channel, user 20 may add that track to their library through e.g., one or more menus (not shown) displayable on display panel 116 and navigable by user 20.

Personal media device 38 may write, to the above-described addtolibrary.dat file, identifying information that defines the track to be added to the library. As discussed above, MTP is a set of custom extensions of the Picture Transfer Protocol (PTP) devised by Microsoft™ that allows for the transfer of media data from various client electronic devices (e.g., personal media devices 36, 38, personal digital assistant 40 and data-enabled cellular telephone 42) to personal computers.

MTP may use a plurality of object properties including (but not limited to) the "SyncID" object property. The "SyncID" object property may be used by media distribution system 16 and personal media device 38 to transfer track-specific information between system 16 and device 38. Numerous pieces of information may be included within "SyncID", examples of which may include but are not limited to:

versionid: The "versionid" may define the version of media distribution system 16. As discussed above, an example of media distribution system 16 is the Rhapsody™ service offered by RealNetworks, Inc. of Seattle, Wash. Accordingly, the "versionid" may define the version of the Rhapsody™ service.

trackid: The "trackid" may define an ID for the track that is understandable by media distribution system 16. As discussed above, an example of media distribution system 16 is the Rhapsody™ service offered by RealNetworks, Inc. of Seattle, Wash. Accordingly, the "trackid" may be a Rhapsody Track ID that defines a particular track available through the Rhapsody™ service.

artistid: The "artistid" may define an ID for the artist that is understandable by media distribution system 16. The "artistid" may be optional, as some artists may not have an artist id within media distribution system 16.

albumid: The "albumid" may define an ID for the album that is understandable by media distribution system 16.

albumartistid: The "albumartistid" may define the an ID for the album artist that is understandable by media distribution system 16. If an artist does not have an "artistid", the artist may not have an "albumartistid".

genreid: The "genreid" may define an ID for the genre that is understandable by media distribution system 16.

An example of "SyncID" is as follows:
rhap_ver=4.0|trackid=7307228|artistid=182811|albumid=1032148|albumartistid=182811|genreid=2102

When a track is transferred to personal media device 38, device 38 may process the "SyncID" to extract 206 the above-described versionid, trackid, artistid, albumid, albumartistid, and genreid from the "SyncID" and store 208 them within the device database (not shown) included within personal media device 38. The device database (not shown) may be stored on storage device 66.

Once extracted, one or more of these various IDs (e.g., versionid, trackid, artistid, albumid, albumartistid, and genreid) may be included within any of supplemental configuration files 64. For example, when a user is listening to a channel track and adds that track to their library, the pertinent ID information (e.g., trackid, artistid, albumid) may be retrieved from the device database (not shown) included within personal media device 38 and the addtolibrary.dat file may be modified to include this information. When personal media device 38 subsequently reconnects to media distribution system 16, media distribution system 16 and/or client-side media manager 46 may obtain the pertinent ID information (e.g., trackid, artistid, albumid) from the addtolibrary.dat file so that the system database (not shown) of media distribution system 16 may be updated to reflect the changes made to the user's library.

The Ratings.dat File

The ratings.dat file may be provided 202 to personal media device 38 and may be read and cleared by media distribution system 16 and/or client-side media manager 46 when personal media device 38 is coupled to media distribution system 16 and/or client-side media manager 46. The ratings.dat file may include a list of track identifiers for the tracks that user 20 has rated on personal media device 38 while uncoupled from media distribution system 16 and/or client-side media manager 46. As discussed above, the track identifiers may be included within the PLAYSFORSURE® metadata of the track to be added.

The RadioPC.txt File

The radiopc.txt file may be provided 202 to personal media device 38 and may be read and cleared by media distribution system 16 and/or client-side media manager 46 when personal media device 38 is coupled to media distribution system 16 and/or client-side media manager 46. The radiopc.txt file may define the following:

A channel_id value for each channel.

A station_type value for each channel.

A tracks_played value may count how many tracks from a given channel have been rendered. This tracks_played value may be used by media distribution system 16 and/or client-side media manager 46 to intelligently update a channel's content when the device is coupled to media distribution system 16 and/or client-side media manager 46.

A track_index value may: (a) mark the position within a channel where the device should begin rendering the next track; and (b) provide media distribution system 16 and/or client-side media manager 46 with information to intelligently update a channel's content.

A channel_looped value may be set to "1" when the last track in the corresponding channel has been played/skipped. This value may be used by media distribution system 16 and/or client-side media manager 46 to update the media tracks in a given channel.

A number of implementations have been described. Nevertheless, it will be understood that various modifications may be made. Accordingly, other implementations are within the scope of the following claims.

What is claimed is:

1. A method comprising:
    obtaining a main configuration file from a client electronic device upon the client electronic device being coupled to at least a portion of a media distribution system, the main configuration file defining one or more enhanced functionalities of the client electronic device; and
    providing a supplemental configuration file to the client electronic device in response to obtaining the main configuration file, the supplemental configuration file to configure the client electronic device to implement at least one of the enhanced functionalities to obtain media data from the media distribution system, wherein the supplemental configuration file comprises one of a subscription file, a messaging file, a channels file, an add to library file, a ratings mapping file, and a radio PC file;
    wherein the client electronic device is coupled to the at least a portion of the media distribution system using a binary transfer protocol configured to transfer media data from the at least a portion of a media distribution system to the client electronic device.

2. The method of claim 1 wherein at least one of the main configuration file and the supplemental configuration file is an XML configuration file.

3. The method of claim 1 wherein the client electronic device is a
MTP-enabled client electronic device.

4. The method of claim 3 wherein the MTP-enabled client electronic device is a PLAYSFORSURE® client electronic device.

5. The method of claim 1 wherein the at least a portion of the media distribution system includes a client-side media manager.

6. The method of claim 5 wherein the client-side media manager is configured to interface with a server-side media distribution system.

7. The method of claim 1 wherein the at least a portion of the media distribution system includes a server-side media distribution system.

8. The method of claim 1 wherein the client electronic device is configured to be wirelessly-coupled to the at least a portion of the media distribution system.

9. The method of claim 1 wherein the client electronic device is configured to be hardwire-coupled to the at least a portion of the media distribution system.

10. The method of claim 1 further comprising:
    processing a SyncID, transferable using the binary transfer protocol, to extract one or more of a versionid, a trackid, an artistid, an albumid, an albumartistid, and a genreid; and
    storing one or more of the versionid, the trackid, the artistid, the albumid, the albumartistid and the genreid within a device database included within the client electronic device.

11. A computer program product residing on a non-transitory computer readable medium having a plurality of instructions stored thereon which, when executed by a processor, cause the processor to perform operations comprising:
    obtaining a main configuration file from a client electronic device upon the client electronic device being coupled to at least a portion of a media distribution system, the main configuration file defining one or more enhanced functionalities of the client electronic device; and
    providing a supplemental configuration file to the client electronic device in response to obtaining the main configuration file, the supplemental configuration file to configure the client electronic device to implement at least one of the enhanced functionalities to obtain media data from the media distribution system, wherein the supplemental configuration file comprises one of a subscription file, a messaging file, a channels file, an add to library file, a ratings mapping file, and a radio PC file;
    wherein the client electronic device is coupled to the at least a portion of the media distribution system using a binary transfer protocol configured to transfer media data from the at least a portion of a media distribution system to the client electronic device.

12. The computer program product of claim 11 wherein at least one of the main configuration file and the supplemental configuration file is an XML configuration file.

13. The computer program product of claim 11 wherein the client electronic device is a MTP-enabled client electronic device.

14. The computer program product of claim 13 wherein the MTP-enabled client electronic device is a PLAYSFORSURE® client electronic device.

15. The computer program product of claim 11 wherein the at least a portion of the media distribution system includes a client-side media manager.

16. The computer program product of claim 15 wherein the client-side media manager is configured to interface with a server-side media distribution system.

17. The computer program product of claim 11 wherein the at least a portion of the media distribution system includes a server-side media distribution system.

18. The computer program product of claim 11 wherein the client electronic device is configured to be wirelessly-coupled to the at least a portion of the media distribution system.

19. The computer program product of claim 11 further comprising instructions for:
    processing a SyncID, transferable using the binary transfer protocol, to extract one or more of a versionid, a trackid, an artistid, an albumid, an albumartistid, and a genreid; and
    storing one or more of the versionid, the trackid, the artistid, the albumid, the albumartistid and the genreid within a device database included within the personal client electronic device.

20. A computer-implemented method comprising:
    receiving a plurality of main configurations, each main configuration being received from one of a plurality of client electronic devices capable of supporting one or more enhanced functionalities for obtaining media content from a media distributor;
    using a main configuration of a first client electronic device of the plurality of client electronic devices to identify one or more enhanced functionalities supported by the first client electronic device and provided by the media distributor for obtaining media data from the media distributor; and providing a supplemental configuration to the first client electronic device, the supplemental configuration to configure the first client electronic device to implement the identified enhanced functionalities supported by the first client electronic device and by the media distributor, wherein the supplemental configuration comprises one of a subscription file, a messaging file, a channels file, an add to library file, a ratings mapping file, and a radio PC file;

wherein the supplemental configuration configures the first client electronic device to implement an enhanced functionality not supported by a second client electronic device of the plurality of client electronic devices.

* * * * *